United States Patent
Wentink

(10) Patent No.: US 9,801,124 B2
(45) Date of Patent: Oct. 24, 2017

(54) SYSTEMS AND METHODS FOR CONFIGURING CONNECTIVITY IN A WIRELESS NETWORK

(71) Applicant: QUALCOMM Incorporated, San Diego, CA (US)

(72) Inventor: Maarten Menzo Wentink, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/737,799

(22) Filed: Jan. 9, 2013

(65) Prior Publication Data

US 2013/0297754 A1    Nov. 7, 2013

Related U.S. Application Data

(60) Provisional application No. 61/641,135, filed on May 1, 2012.

(51) Int. Cl.
*G06F 15/177* (2006.01)
*H04W 48/18* (2009.01)
(Continued)

(52) U.S. Cl.
CPC ......... *H04W 48/18* (2013.01); *H04L 12/5692* (2013.01); *H04L 61/2015* (2013.01); *H04W 76/022* (2013.01); *H04L 61/1511* (2013.01)

(58) Field of Classification Search
CPC ........... H04W 36/005; H04W 36/0011; H04W 80/04; H04L 61/2015; H04L 69/32; H04L 63/08; H04L 63/063; H04L 63/0892
(Continued)

(56) References Cited

U.S. PATENT DOCUMENTS 6,704,293 B1    3/2004  Larsson et al.
7,519,364 B2    4/2009  Nair et al.
(Continued)

FOREIGN PATENT DOCUMENTS

| CN | 102026163 A | 4/2011 |
| EP | 1892883 A1 | 2/2008 |
| WO | 2004008693 A1 | 1/2004 |

OTHER PUBLICATIONS

UPnP Forum, UPnP Device Architecture 1.0, Document Revision Date Apr. 24, 2008, pp. 3, 8 http://www.upnp.org/specs/arch/UPnP-arch-DeviceArchitecture-v1.0-20080424.pdf.*
(Continued)

*Primary Examiner* — Chirag R Patel
*Assistant Examiner* — Rachel J Hackenberg
(74) *Attorney, Agent, or Firm* — Joseph Hanasz

(57) ABSTRACT

Systems, methods, and devices for configuring connectivity in a wireless network are described herein. In some aspects, a wireless device configured to connect to a first wireless network includes a receiver configured to receive a first dynamic host configuration protocol (DHCP) message from a first network device on the first wireless network. The wireless device further includes a processor configured to determine whether the first DHCP message indicates that the first wireless network does not provide access to a second network. The processor is further configured to determine whether to maintain a connection to the second network accessed using a third wireless network based on the first DHCP message. The leader device further includes a transmitter configured to transmit a second DHCP message to the first network device to connect to the first wireless network. The wireless device is further configured to supply devices on a first wireless network with access to a second network.

81 Claims, 10 Drawing Sheets

(51) Int. Cl.
*H04L 12/54* (2013.01)
*H04L 29/12* (2006.01)
*H04W 76/02* (2009.01)

(58) Field of Classification Search
USPC .................. 709/226, 228; 455/436; 370/329
See application file for complete search history.

(56) References Cited

U.S. PATENT DOCUMENTS

| | | | |
|---|---|---|---|
| 7,574,212 B2 | 8/2009 | McConnell et al. | |
| 8,185,629 B2* | 5/2012 | Hoeksel | 709/225 |
| 8,811,187 B2* | 8/2014 | Macias et al. | 370/241 |
| 8,918,531 B2* | 12/2014 | Asati | H04L 12/4641 |
| | | | 709/220 |
| 2006/0159101 A1* | 7/2006 | Turk | H04L 29/12283 |
| | | | 370/395.2 |
| 2006/0268782 A1* | 11/2006 | Kwak et al. | 370/331 |
| 2006/0274743 A1 | 12/2006 | Yegin et al. | |
| 2007/0064634 A1* | 3/2007 | Huotari et al. | 370/310 |
| 2007/0087748 A1 | 4/2007 | Du et al. | |
| 2007/0183367 A1 | 8/2007 | Park | |
| 2009/0132696 A1* | 5/2009 | Cankaya | H04L 61/2015 |
| | | | 709/224 |
| 2010/0146148 A1* | 6/2010 | Schwimer | H04L 67/1002 |
| | | | 709/238 |
| 2010/0280961 A1* | 11/2010 | Thyni | 705/80 |
| 2012/0008578 A1 | 1/2012 | Kant et al. | |
| 2014/0148129 A1* | 5/2014 | Lundstrom | 455/411 |
| 2014/0164630 A1* | 6/2014 | Wu et al. | 709/227 |
| 2014/0245410 A1* | 8/2014 | Frelechoux | 726/6 |

OTHER PUBLICATIONS

Droms R: "Dynamic Host Configuration Protocol; RFC 2131" Internet Engineering Task Force (IETF), (Mar. 1997), pp. 8-10.
IEEE 802.11 "Part 11: Wireless LAN Medium Access Control (MAC) and Physical Layer (PHY) Specifications", Mar. 2012, pp. 1-2793.
International Search Report and Written Opinion—PCT/US2013/039131—ISA/EPO—dated Jul. 11, 2013.
Camps-Mur D., et al., "Designing energy efficient access points with Wi-Fi Direct," Computer Networks, vol. 55, 2011, pp. 2838-2855.
"Wi-Fi Peer-to-Peer (P2P) Specification v1.2", Wi-Fi Peer-To-Peer (P2P) Specification V1.2, Wi-Fl Alliance, US vol. V1.2, 2010, pp. 1-60, XP008165048, Retrieved from the Internet: URL:https://www.wi-fi.org/knowledge-center/published-specifications.

* cited by examiner

SYSTEMS AND METHODS FOR CONFIGURING CONNECTIVITY IN A WIRELESS NETWORK

CLAIM OF PRIORITY UNDER 35 U.S.C. §119

The present application for patent claims priority to Provisional Application No. 61/641,135 entitled "SYSTEMS AND METHODS FOR CONFIGURING CONNECTIVITY IN A WIRELESS NETWORK" filed May 1, 2012, and assigned to the assignee hereof and hereby expressly incorporated by reference herein.

BACKGROUND

Field

The present application relates generally to wireless communications, and more specifically to systems, methods, and devices for configuring connectivity in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The devices joining a wireless network must be configured before they can communicate with other devices in the network. Accordingly, improved systems, methods, and devices for configuring devices for network connectivity are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include reducing the amount of data traffic in a network, reduce a user's monthly data usage charges, reducing network signaling by reducing the number of requests to access an external network, reducing the total energy consumption of the devices, and/or balancing energy consumption across multiple devices.

One aspect of the disclosure provides a wireless device configured to connect to a first wireless network. The wireless device comprises a receiver configured to receive a first dynamic host configuration protocol (DHCP) message from a first network device on the first wireless network. The wireless device further comprises a processor configured to determine whether the first DHCP message indicates that the first wireless network does not provide access to a second network and determine whether to maintain a connection to the second network accessed using a third wireless network based on the first DHCP message, wherein the third wireless network provides access to the second network. The wireless device further comprises a transmitter configured to transmit a second DHCP message to the first network device to connect to the first wireless network.

Another aspect of the disclosure provides a method for connecting to a first wireless network comprising receiving a first dynamic host configuration protocol (DHCP) message from a first network device on the first wireless network; determining whether the first DHCP message indicates that the first wireless network does not provide access to a second network; determining whether to maintain a connection to the second network accessed using a third wireless network based on the first DHCP message, wherein the third wireless network provides access to the second network; and transmitting a second DHCP message to the first network device to connect to the first wireless network.

Another aspect of the disclosure provides a wireless device configured to connect to a first wireless network. The wireless device comprises means for receiving a first dynamic host configuration protocol (DHCP) message from a first network device on the first wireless network. The wireless device further comprises means for determining whether the first DHCP message indicates that the first wireless network does not provide access to a second network and whether to maintain a connection to the second network accessed using a third wireless network based on the first DHCP message, wherein the third wireless network provides access to the second network. The wireless device further comprises means for transmitting a second DHCP message to the first network device to connect to the first wireless network.

Another aspect of the disclosure provides a computer readable medium comprising instructions that when executed cause an apparatus to receive a first dynamic host configuration protocol (DHCP) message from a first network device on a first wireless network; determine whether the first DHCP message indicates that the first wireless network does not provide access to a second network; determine whether to maintain a connection to the second network accessed using a third wireless network based on the first DHCP message, wherein the third wireless network provides access to the second network; and transmit a second DHCP message to the first network device to connect to the first wireless network.

Another aspect of the disclosure provides a network device configured to provide access to a first wireless network. The network device comprises a processor configured to determine whether the first wireless network does not provide access to a second network and create a first dynamic host configuration protocol (DHCP) message with data indicating whether the first wireless network does not provide access to the second network. The network device further comprises a transmitter configured to transmit the first DHCP message to a first wireless device.

Another aspect of the disclosure provides a method for providing access to a first wireless network comprising determining whether the first wireless network does not provide access to a second network; creating a first dynamic host configuration protocol (DHCP) message with data indicating whether the first wireless network does not provide access to the second network; and transmitting the first DHCP message to a first wireless device.

Another aspect of the disclosure provides a network device configured to provide access to a first wireless network. The network device comprises means for determining whether the first wireless network does not provide access to a second network. The network device further comprises means for creating a first dynamic host configuration protocol (DHCP) message with data indicating whether the first wireless network does not provide access to the second network. The network device further comprises means for transmitting the first DHCP message to a first wireless device.

Another aspect of the disclosure provides a computer readable medium comprising instructions that when executed cause a network device to determine whether a first wireless network does not provide access to a second network; create a first dynamic host configuration protocol (DHCP) message with data indicating whether the first wireless network does not provide access to the second network; and transmit the first DHCP message to a first wireless device.

Another aspect of the disclosure provides a wireless device configured to supply devices on a first wireless network with access to a second network. The wireless device comprises a receiver configured to receive a first dynamic host configuration protocol (DHCP) message from a first network device on the first wireless network. The wireless device further comprises a processor configured to determine whether the first wireless network does not provide access to the second network based on the first DHCP message. The wireless device further comprises a transmitter configured to transmit a second DHCP message to the first wireless network to allow devices connected to the first wireless network to connect to the second network using a third wireless network.

Another aspect of the disclosure provides a method for supplying devices on a first wireless network with access to a second network comprising receiving a first dynamic host configuration protocol (DHCP) message from a first network device on the first wireless network; determining whether the first wireless network does not provide access to the second network based on the first DHCP message; and transmitting a second DHCP message to the first wireless network to allow devices connected to the first wireless network to connect to the second network using a third wireless network.

Another aspect of the disclosure provides a wireless device configured to supply devices on a first wireless network with access to a second network comprising means for receiving a first dynamic host configuration protocol (DHCP) message from a first network device on the first wireless network. The wireless device further comprises means for determining whether the first wireless network does not provide access to the second network based on the first DHCP message. The wireless device further comprises means for transmitting a second DHCP message to the first wireless network to allow devices connected to the first wireless network to connect to the second network using a third wireless network.

Another aspect of the disclosure provides a computer readable medium comprising instructions that when executed cause an apparatus to: receive a first dynamic host configuration protocol (DHCP) message from a first network device on the first wireless network; determine whether the first wireless network does not provide access to the second network based on the first DHCP message; and transmit a second DHCP message to the first wireless network to allow devices connected to the first wireless network to connect to the second network using a third wireless network.

DETAILED DESCRIPTION

Figure 1:
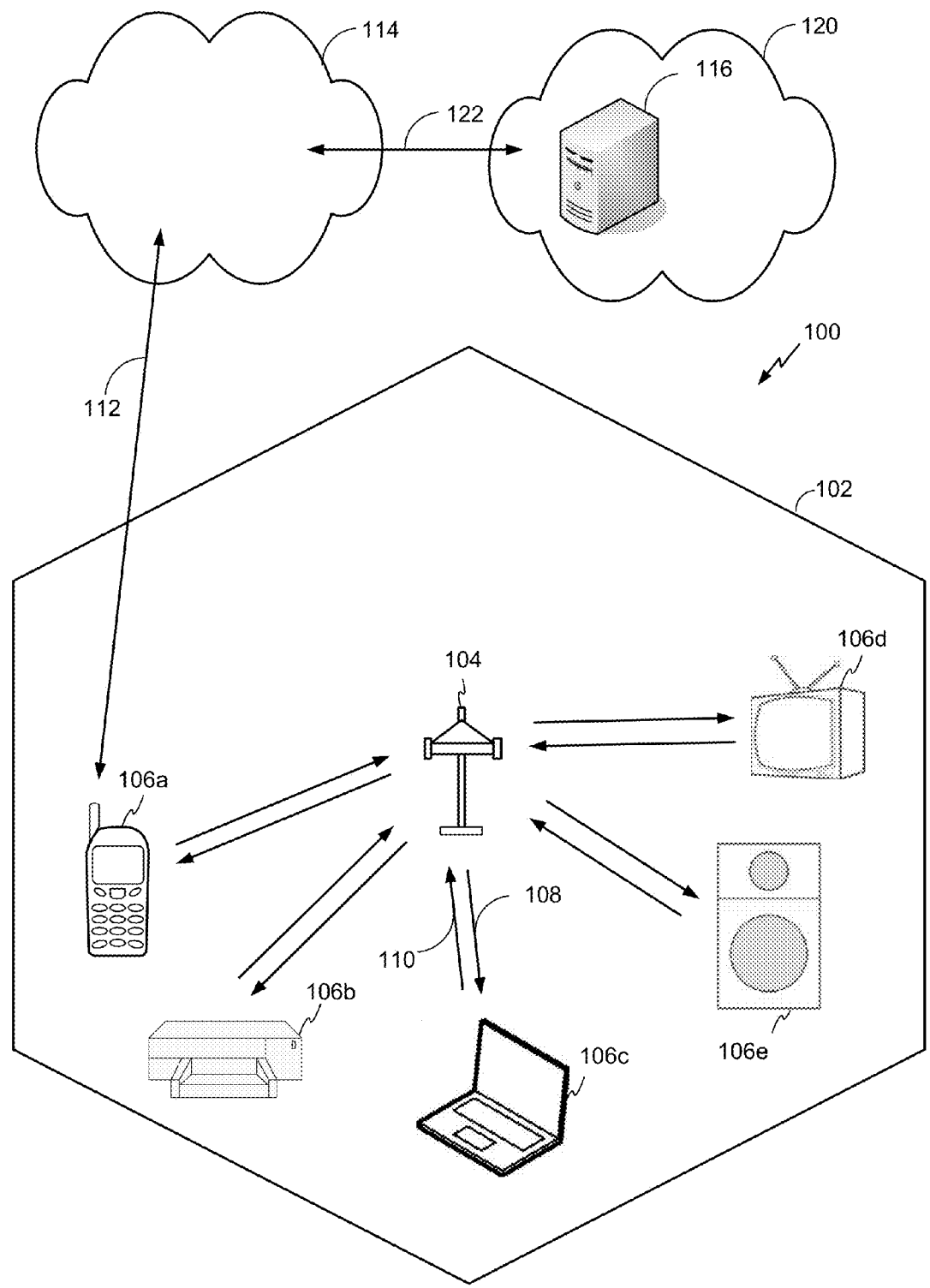
FIG. 1 illustrates a wireless communication system in which aspects of the present disclosure may be employed, according to an embodiment.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE family of wireless protocols. For example, the various aspects described herein may be used as part of the IEEE 802.11n protocol.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, wireless video device, mobile hotspot, etc. In an example, a STA connects to an AP via a WiFi (e.g., IEEE 802.11 protocol such as 802.11n) compliant wireless link to obtain general connectivity to the Internet or to other wide area networks. In another example, a STA can connect to an AP via a cellular data link or a Wide Area Network (WAN) (e.g., GPRS, EDGE, 1xRTTT, EV-DO, W-CDMA (including HSDPA and HSUPA), UMTS-TDD, WiMAX, LTE, etc.). The AP may interconnect with the Internet or with other wide area networks over a link that may be referred to as a backhaul. In some implementations a STA may also be used as an AP.

An access point ("AP") may also comprise, be implemented as, or known as a NodeB, eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard, for example the 802.11n standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. Moreover, there may be more than one AP 104, and each STA 106 may connect to one or more of the various APs 104.

In some aspects, the AP 104 may use a backhaul communication link to communicate with a larger network. The network may be, for example, the Internet or a public switched telephone network (PSTN). The backhaul may comprise several physical links. In an embodiment, the STA 106 may communicate with a server via the AP 104. For example, the STA 106 may communicate with the AP 104 via the uplink 110 and the downlink 108, and the AP 104 may relay the communication to the server via the backhaul communication link.

In some embodiments, the STA 106a may communicate with a Wide Area Network (WAN) 114 (e.g., GPRS, EDGE, 1xRTTT, EV-DO, W-CDMA (including HSDPA and HSUPA), UMTS-TDD, WiMAX, LTE, etc.) via communication link 112. The network 114 may further provide access to a network 120 via communication link 122. Network 120 may be a data network, such as the Internet or a public switched telephone network (PSTN). A person having ordinary skill in the art will appreciate that other STAs 106b-e may communicate with the WAN network 114 and may have access to the data network 120 using the WAN network 114.

Figure 2:
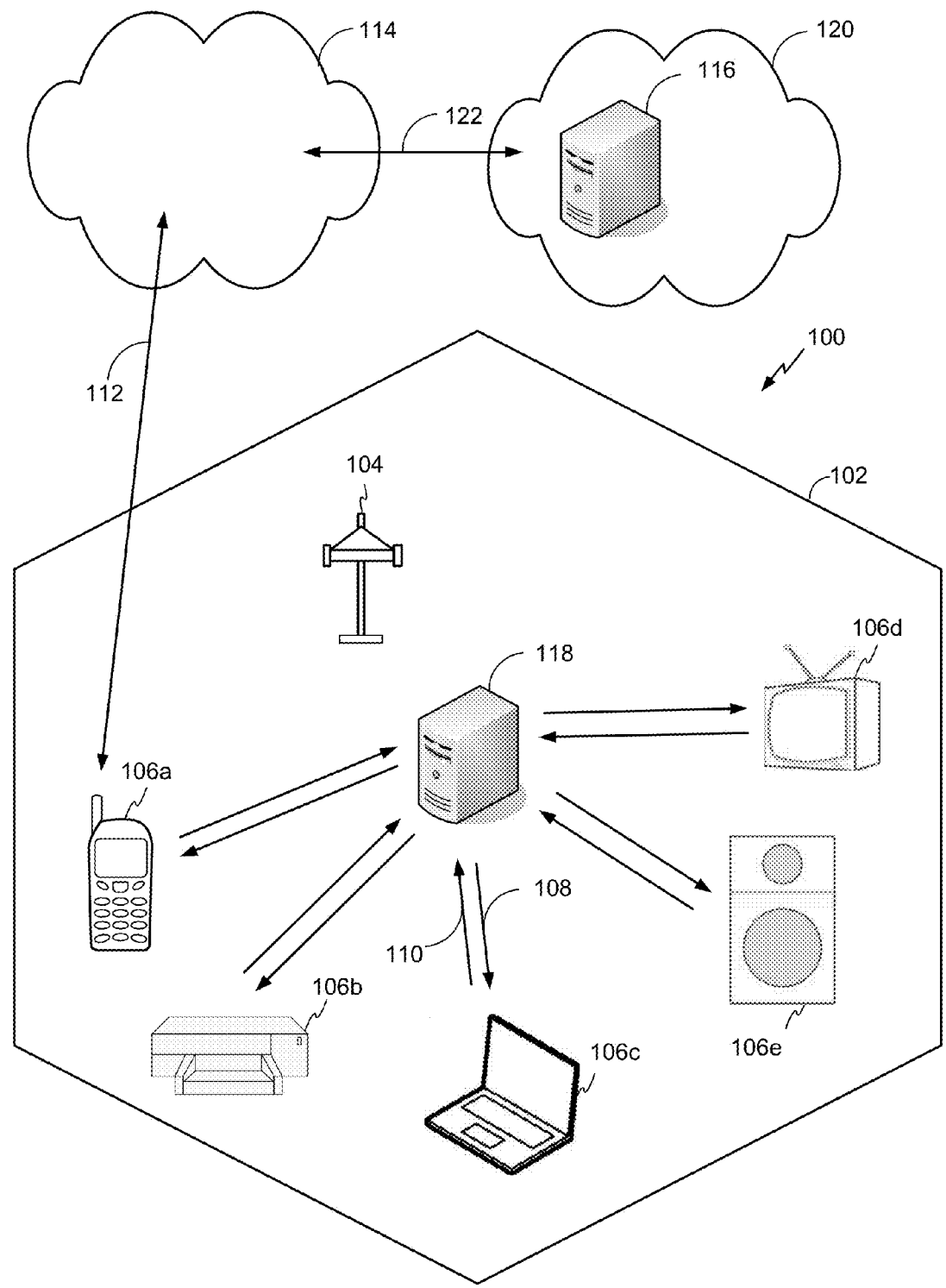
FIG. 2 illustrates the wireless communication system of FIG. 1, according to another embodiment.

FIG. 2 illustrates the wireless communication system of FIG. 1, according to another embodiment. In the illustrated embodiment, the AP 104 continues to act as a base station for the STAs 106. As shown in FIG. 2, however, the STA 106a has recently entered the BSA 102. In some embodiments, the BSA 102 may be referred to as a WLAN 102. Upon entering the WLAN 102, the STA 106a may communicate with a server 118 in order to configure itself for communicating within the WLAN 102. One example of a configuration protocol for configuring STAs 106 in a network is Dynamic Host Configuration Protocol (DHCP). DHCP allows a client, such as STA 106a, to request and obtain a network address (e.g., an Internet Protocol (IP) address) on a network for a finite period of time, called a lease. DHCP further allows a client to obtain other important information, such as addresses of servers on the network (e.g., Domain Name System (DNS) server addresses, Hyper Text Markup Language (HTTP) server addresses, Simple Mail Transfer Protocol (SMTP) server addresses, etc.). The client, upon entering the network, exchanges a set of messages with a group of DHCP servers in order to obtain configuration parameters or information so that the client may be configured to communicate with other devices on the network. Server 118 may be one such DHCP server.

Figure 5:
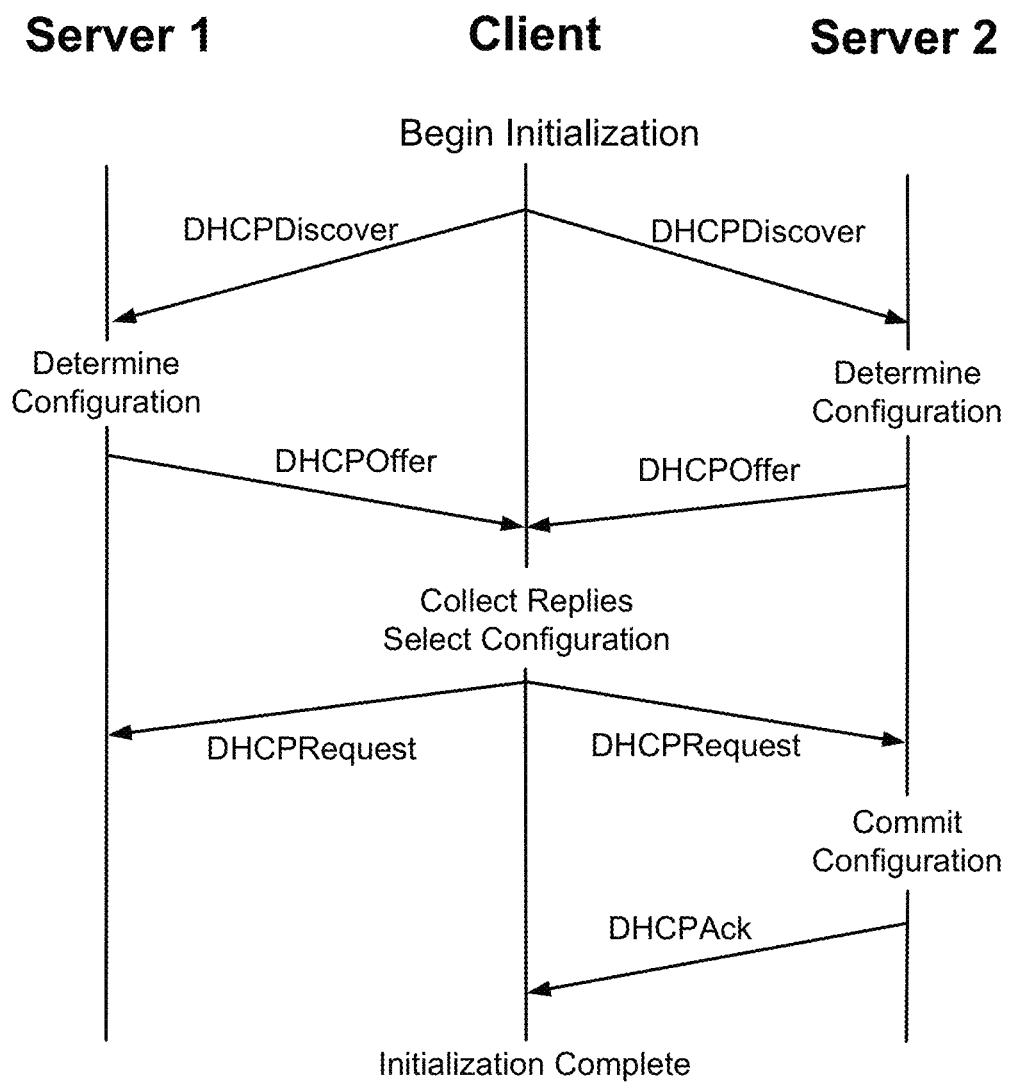
FIG. 5 illustrates a diagram of a network configuration protocol that may be employed within the wireless communication system of FIGS. 2 and/or 3.

FIG. 5 illustrates an example of DHCP messaging protocol and the initialization process of configuring a client for communicating within a network. A DHCP server manages a pool of IP addresses and information about client configuration parameters so that it may efficiently allocate network addresses and other configuration parameters to the various clients within its subnet(s). As shown in FIG. 5, the client begins initialization by broadcasting a DHCPDiscover message to its local physical subnet asking for configuration parameters from one or more DHCP servers. The client may collect one or more DHCPOffer messages from one or more DHCP servers that include an offer of configuration parameters, such as an available network address along with other configuration parameters. The client selects one of the DHCP servers to accept based upon the offered configuration parameters. Once the client has selected one of the DHCP servers, the client sends a DHCPRequest message to all of the servers specifying the selected server and requesting the offered configuration parameters from the selected server. Servers not selected by the client recognize the message as notification that the client has declined their offer. The selected server responds to the client with a DHCPAck message if it determines that the requested parameters are acceptable. The DHCPAck message includes the configuration parameters for the client, including the assigned network address. The combination of a client identifier supplied in a client identifier option and the assigned network address establishes a unique identifier for the client's lease. Upon receiving the DHCPAck message and performing a check on the parameters (e.g., to check if the address is already in use) the client is configured.

If the DHCP server determines that the requested parameters are not acceptable and is unable to satisfy the client's request, the server may send a DHCPNak message to the client (not shown). If a client receives a DHCPNak message, the client will restart the configuration process. The various DHCP messages include DHCP options fields that the server and client may use in order to indicate desired configuration parameters. For example, when a client broadcasts a DHCPRequest message, the message must include a server identifier option in order to indicate the selected server. As another example, if a client needs to know the address of a local DNS server, it may request it by specifying that option in the options field. A person having ordinary skill in the art will appreciate that other types of messages may be exchanged between clients and DHCP servers.

Referring again to FIG. 2, the STAs 106 may exchange DHCP messages with the server 118 acting as a DHCP server. The STA 106a, for example, may begin by broadcasting a DHCPDiscover message to various DHCP servers on the WLAN network 102. In response, the server 118 may send a DHCPOffer message including the required configuration parameters, such as the network address that is to be assigned to the STA 106a. The STA 106a may select server 118 and send a DHCPRequest message to all of the servers specifying that the server 118 has been selected and requesting the offered configuration parameters. The server 118 may then respond to the client with a DHCPAck message after it determines that the requested parameters are acceptable. The STA 106a is configured to operate in the WLAN network 102 after it receives the DHCPAck message and checks all parameters.

In some aspects, if the STA 106a determines from the configuration parameters that the WLAN network 102 provides access to data network 120, the STA 106a may disconnect from the data network being accessed using WAN network 114. For example, data network 120 may be an Internet network. The STA 106a may be configured to switch from its Internet connection using WAN network 114 to an Internet connection using WLAN network 102. However, in some aspects, the WLAN network 102 may not provide access to the data network 120. For example, the WLAN network 102 may connect to local devices such as a printer 106b, speakers 106e, and a TV 106d, but not to the data network 120. An example of a WLAN network that does not provide access to a data network is a local network within a vehicle. In instances where the WLAN network 102 does not provide access to the data network 120, the STA 106a may disconnect from network 120 being accessed through WAN network 114, leaving it without any data connection.

In some aspects, the server 118 may exclude particular options from one or more DHCP messages in order to indicate various network parameters to the STAs 106. For example, in some aspects, the server 118 may determine that the WLAN network 102 does not provide access to the data network 120, and may exclude a router option and a Domain Name System (DNS) server option from a DHCPAck message. In some aspects, the server 118 may exclude a router option and a DNS server option from a DHCPOffer message in response to determining that no data network 120 access is available in the WLAN network 102. In other aspects, the server 118 may exclude only a router option or only a DNS server option from the messages to indicate that the WLAN network 102 lacks access to the data network 120. A person having ordinary skill in the art will appreciate that other types of options may be excluded to indicate other network configurations and parameters.

The STAs 106 are configured to recognize the absence of options in the DHCP messages. For example, in response to receiving a DHCPAck and/or a DHCPOffer message without router and DNS server options, the STA 106a may determine that the WLAN network 102 does not provide access to the data network 120. The STA 106a may then maintain its connection to the data network 120 that is being accessed using the WAN network 114. The STA 106a will then have continued access to the data network 120 using WAN network 114, while also being able to simultaneously access the WLAN network 102.

In some aspects, the STAs 106 may display network indicators via a user interface (e.g., display, graphical user interface (GUI), touchscreen, etc.), indicating that both the WAN network 114 connection and the WLAN network 102 connection are active. In some aspects, the STAs 106 may display an altered WLAN network 102 indicator in order to indicate that the WLAN network 102 does not provide access to the data network 102. In some aspects, the STAs 106 may display an altered WAN network 114 indicator in order to indicate that it is being shared with the WLAN network 102. In some aspects, the WLAN network 102 indicator and the WAN network 114 indicator may be combined on an STA 106 user interface in order to indicate a connection to a local WLAN network 102 along with data network 120 connectivity being accessed using the WAN network 114.

In other aspects, the STA 106*a* may be configured to share its data network 120 access being provided through the WAN network 114 with other STAs 106*b-e*. By sharing its connection to the data network 102 through the WAN network 114, the entire WLAN 102 may be able to connect to the data network 120. The STA 106*a* does not necessarily act as an access point or a gateway as in the case with other hotspot related technologies. Instead, the STA 106*a* is a client in the WLAN network 102 and may act as a router or as a default gateway.

In some aspects, STA 106*a* may share its access to the data network 120 using the DHCP messaging protocol. DHCP messages may be used to configure the WLAN network 102 so that the STAs 106*b-e* may access the data network 120 by sharing the STA 106*a*'s data network 120 connection being accessed using the WAN network 114. In some aspects, the DHCP protocol may be expanded to include a DHCP router announcement message (DHCPRouterAnnouncement). The DHCP router announcement message may include the Internet Protocol (IP) address of the STA 106*a*, indicating to the other STAs 106*b-e*, or any other WLAN network 102 devices, that the STA 106*a* is acting as a router through which the STAs 106*b-e* may access the data network 120 using WAN network 114. The DHCP router announcement message may also include the IP addresses of any Domain Name System (DNS) servers on the data network 120. The IP address of the STA 106*a* and the IP addresses of the DNS servers may be included in the DHCP options fields of the DHCP Router Announcement message. Other options may further be included in the DHCP Router Announcement message, such as information about the lease time, the subnet mask, etc.

As illustrated in FIG. 2, a DHCP router announcement message may be transmitted by STA 106*a* as a unicast message directly to the server 118 (e.g., DHCP server). The server 118 receives the DHCP router announcement message with the IP address of the STA 106*a* and the addresses of the DNS servers, and determines that a connection to the data network 102 is to be used on the server's subnet. The server 118 may then transmit a unicast DHCP Ack message to the STAs 106 that are identified by the used IP addresses in its address pool. These DHCP Ack messages specify the router (i.e., STA 106*a*) IP address and the DNS server IP addresses obtained from the DHCP router announcement message. The STAs 106 are configured to receive and act upon the unsolicited DHCP ACk messages and may use the information included in the DHCP Ack message to configure access to the data network 120 through the WAN network 114. The STA 106*a* will act as a router or default gateway for all data traffic destined for the data network 120. In some aspects, for STAs 106 or other WLAN 102 network devices that do not support unsolicited DHCP Ack messages, the server 118 may precede the DHCP Ack message with a DHCP Nak message. In some aspects, the server 118 may forward the DHCP router announcement message as a unicast message only to the IP addresses of STAs for which it is known that router announcement messages are supported.

Figure 3:
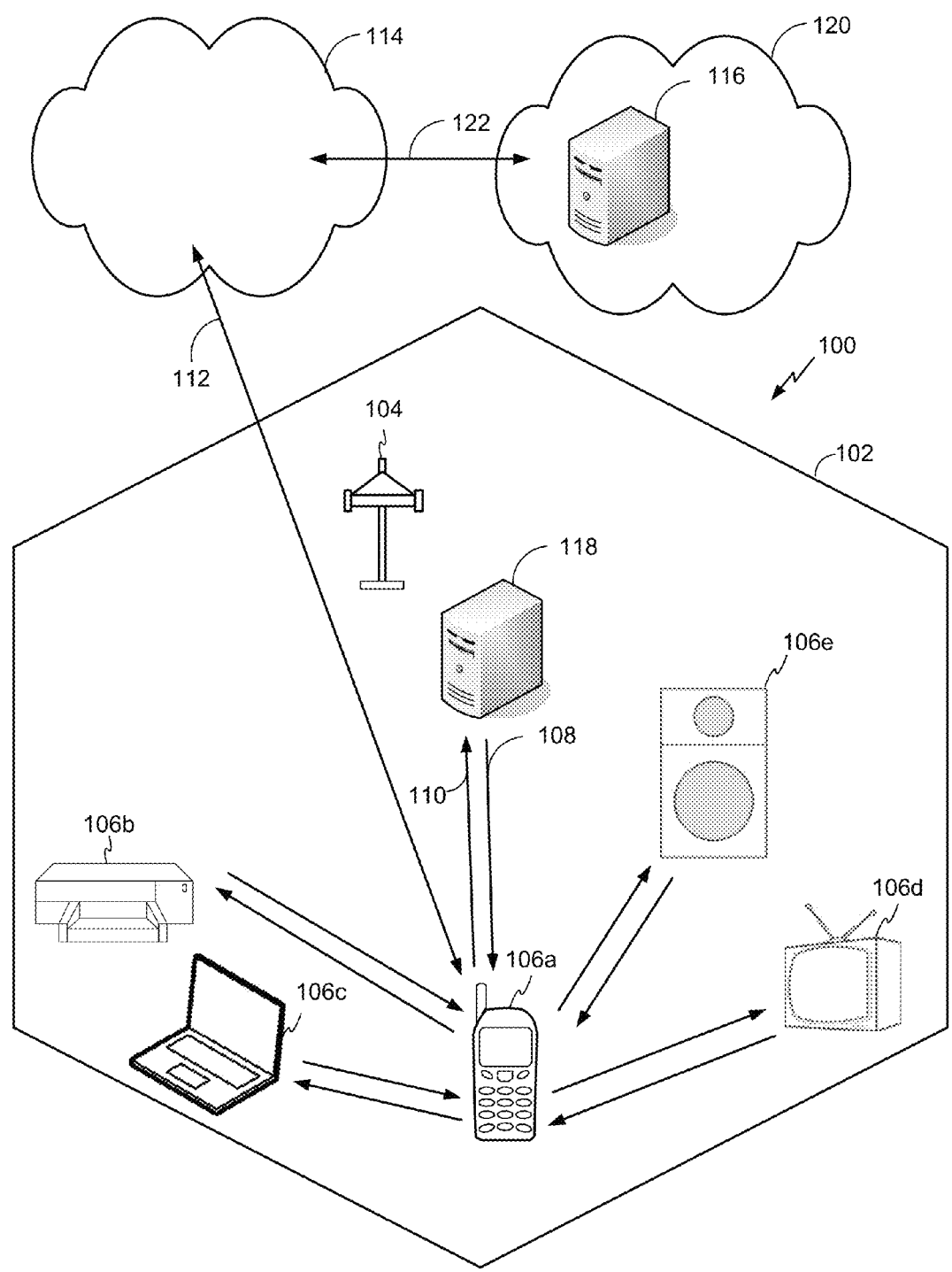
FIG. 3 illustrates the wireless communication system of FIG. 1, according to another embodiment.

In some aspects, the router announcement message may be transmitted by the STA 106*a* as a broadcast message to all devices on the WLAN network 102, as illustrated in FIG. 3. When the DHCP router announcement is transmitted as a broadcast message, the STAs 106 and other WLAN 102 network devices can use the information in the message configure access to the data network 120 through the WAN network 114. IP packets sent by STA's 106*b-e* or other WLAN 102 network devices that are destined for an IP address outside of the subnet of the server 118 are sent to the STA 106*a* for routing. In some aspects, the broadcast DHCP router announcement message may be periodically repeated in order to improve its reliability.

An exemplary DHCP router announcement message is illustrated in Table 1.

TABLE 1

Example DHCP router announcement message.

IP: ID = 0x3D30; Proto = UDP; Len: 328
IP: Version = 4 (0x4)
IP: Header Length = 20 (0x14)
IP: Service Type = 0 (0x0)
IP: Precedence = Routine
IP: ...0.... = Normal Delay
IP: ....0... = Normal Throughput
IP: .....0.. = Normal Reliability
IP: Total Length = 328 (0x148)
IP: Identification = 15664 (0x3D30)
IP: Flags Summary = 0 (0x0)
IP: .......0 = Last fragment in datagram
IP: ......0. = May fragment datagram if necessary
IP: Fragment Offset = 0 (0x0) bytes
IP: Time to Live = 128 (0x80)
IP: Protocol = UDP—User Datagram
IP: Checksum = 0x2EA8
IP: Source Address = 157.54.48.151
IP: Destination Address = 255.255.255.255 (Broadcast)
IP: Data: Number of data bytes remaining = XXX
DHCP: Router Announcement (xid = XXXXXXXX)
DHCP: Op Code (op) = 2 (0x2)
DHCP: Hardware Type (htype) = 1 (0x1) 10 Mb Ethernet
DHCP: Hardware Address Length (hlen) = 6 (0x6)
DHCP: Hops (hops) = 0 (0x0)
DHCP: Transaction ID (xid) = 556223005 (0x21274A1D)
DHCP: Seconds (secs) = 0 (0x0)
DHCP: Flags (flags) = 0 (0x0)
DHCP: 0............... = No Broadcast
DHCP: Client IP Address (ciaddr) = 0.0.0.0
DHCP: Your IP Address (yiaddr) = 0.0.0.0
DHCP: Server IP Address (siaddr) = 0.0.0.0
DHCP: Relay IP Address (giaddr) = 0.0.0.0
DHCP: Client Ethernet Address (chaddr) = 08002B2ED85E
DHCP: Server Host Name (sname) = <Blank>
DHCP: Boot File Name (file) = <Blank>
DHCP: Magic Cookie = [OK]
DHCP: Option Field (options)
DHCP: DHCP Message Type = DHCP Router Announcement
DHCP: Router = 157.54.48.151
DHCP: DNS Servers = 9.7.10.15, 9.7.10.16, 9.7.10.18
DHCP: End of this option field A person having ordinary skill in the art will appreciate that other types of protocols may be used to provide shared data network access. For example, the shared data network access information (i.e. the router IP address and the DNS addresses) may be advertised via a proprietary service discovery mechanism, such as DLNA discovery or Apple's Bonjour protocol. For example, the router IP address and the DNS addresses may be included in Bonjour messages that are exchanged similarly to the DHCP messages, and that may be broadcast by the device sharing its data network access. As another example, the presence of a router may be announced using Internet Control Message Protocol (ICMP) Router Discovery messages, but the DNS addresses cannot be included in such messages.

Figure 4:
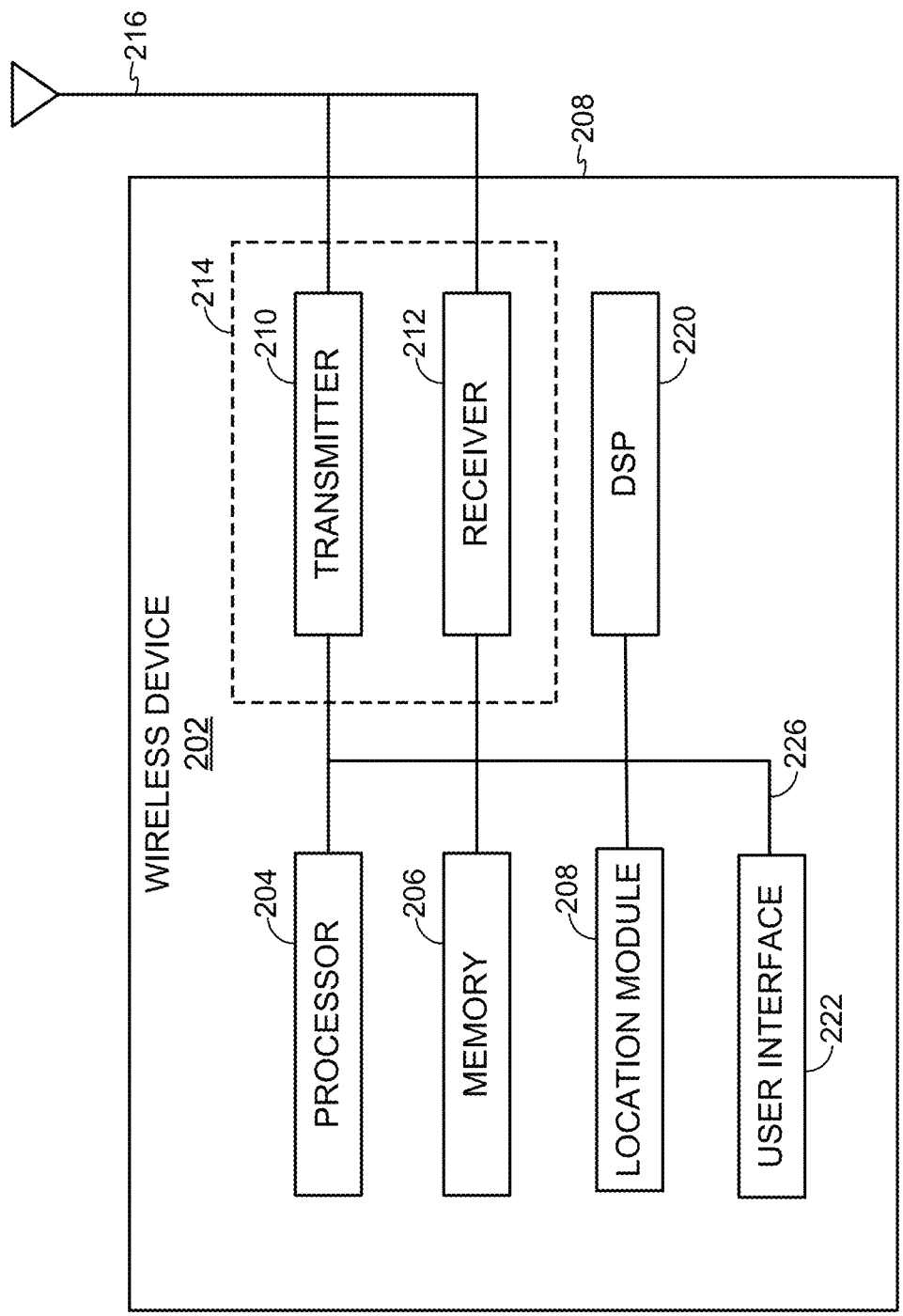
FIG. 4 illustrates various components that may be utilized in a wireless device that may be employed within the wireless communication system of FIGS. 1-3.

FIG. 4 illustrates various components that may be utilized in a wireless device 202 that may be employed within the wireless communication system 100. The wireless device 202 may include a processor 204, a memory 206, a housing 208, a transmitter 210 and a receiver 212 (which may form a transceiver 214), an antenna 216, a location module 218, a digital signal processor (DSP) 220, a user interface 222, and a communication bus 226. The wireless device 202 is an example of a device that may be configured to implement the various methods described herein. For example, the wireless device 202 may comprise the AP 104 and/or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas. The transmitter 210 may be configured to transmit any of the DHCP messages, as discussed above. The receiver 212 may be configured to receive any of the DHCP messages, as discussed above.

The wireless device 202 may also include a location module 218 that may be used to determine a location of the wireless device 202. The location module 218 may determine the location of the wireless device 202 based on, for example, the global positioning system (GPS), assisted global positioning system (AGPS), cellular triangulation, IP-based location awareness techniques, etc. The location module 218 may determine the location of the wireless device 202 in conjunction with the receiver 212, the antenna 216, the processor 204, the memory 206, and/or the DSP 220. The wireless device 202 may also include a digital signal processor (DSP) 220 for use in processing signals. The DSP 220 may be configured to generate a packet for transmission.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user. In an embodiment, the user interface 222 may receive user settings designating preferences pertaining to leader STAs, selection criteria, etc.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 4, those of skill in the art will recognize that one or more of the components may be combined or commonly implemented. For example, the processor 204 may be used to implement not only the functionality described above with respect to the processor 204, but also to implement the functionality described above with respect to the location module 218 and/or the DSP 220. Further, each of the components illustrated in FIG. 4 may be implemented using a plurality of separate elements.

For clarity, the flowcharts below are described with reference to the communication network 100 and devices STAs 106 and server 118 shown in FIGS. 1-3. A person having ordinary skill in the art will appreciate that the method of the flowcharts shown in FIGS. 6-11 can be used with any suitable device. In one implementation, the processor 204 of wireless device 202 shown in FIG. 2 executes one or more sets of codes to control the functional elements of the device 202 to perform the functions described below. In various embodiments, steps described herein may be performed in a different order or omitted, and additional steps may be added.

Figure 6:
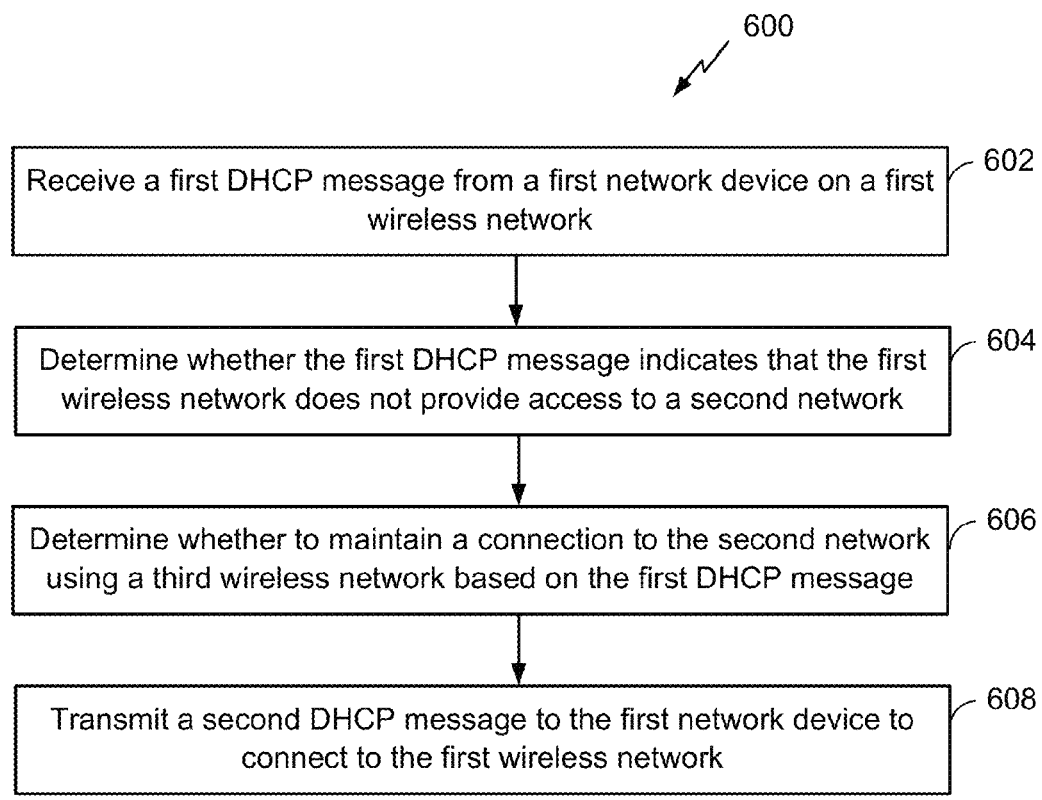
FIG. 6 illustrates a flowchart of an exemplary method of connecting to a wireless network.

FIG. 6 illustrates a flowchart 600 of an exemplary method of connecting to a first wireless network. First, at block 602, the method begins by receiving a first DHCP message from a first network device on a first wireless network. For example, the first network may be the WLAN network 102 and the first network device may be the DHCP server 118 transmitting a first DHCP message to the STA 106a for configuration. In some aspects, the first DHCP message may be a DHCP Offer message. In some aspects, the first DHCP message may be a DHCP Ack message.

At block 604, the method determines whether the first DHCP message indicates that the first wireless network does not provide access to a second network. In some aspects, the second network is the data network 120. For example, the server 118 may exclude a router option and a Domain Name System (DNS) server option from first DHCP message. In response to receiving the first DHCP message without router and DNS server options, the STA 106a may determine that the WLAN network 102 does not provide access to the network 120.

At block 606, the method determines whether to maintain a connection to the second network accessed using a third wireless network based on the first DHCP message, wherein the third wireless network provides access to the second network. In some aspects, the third wireless network is the WAN network 114. For example, the STA 106a may maintain its connection to the data network 120 that is being accessed using the WAN network 114 in response to the determination that the WLAN network 102 does not provide access to the data network 120. The STA 106a will then have continued access to the data network 120 using WAN network 114, while also being able to simultaneously access the WLAN network 102.

The method continues at block 608 by transmitting a second DHCP message to the first network device to connect to the first wireless network. For example, the STA 106a may transmit a DHCP Request message requesting the configuration parameters offered by the server 118 in order to complete configuration for the WLAN network 102.

Figure 7:
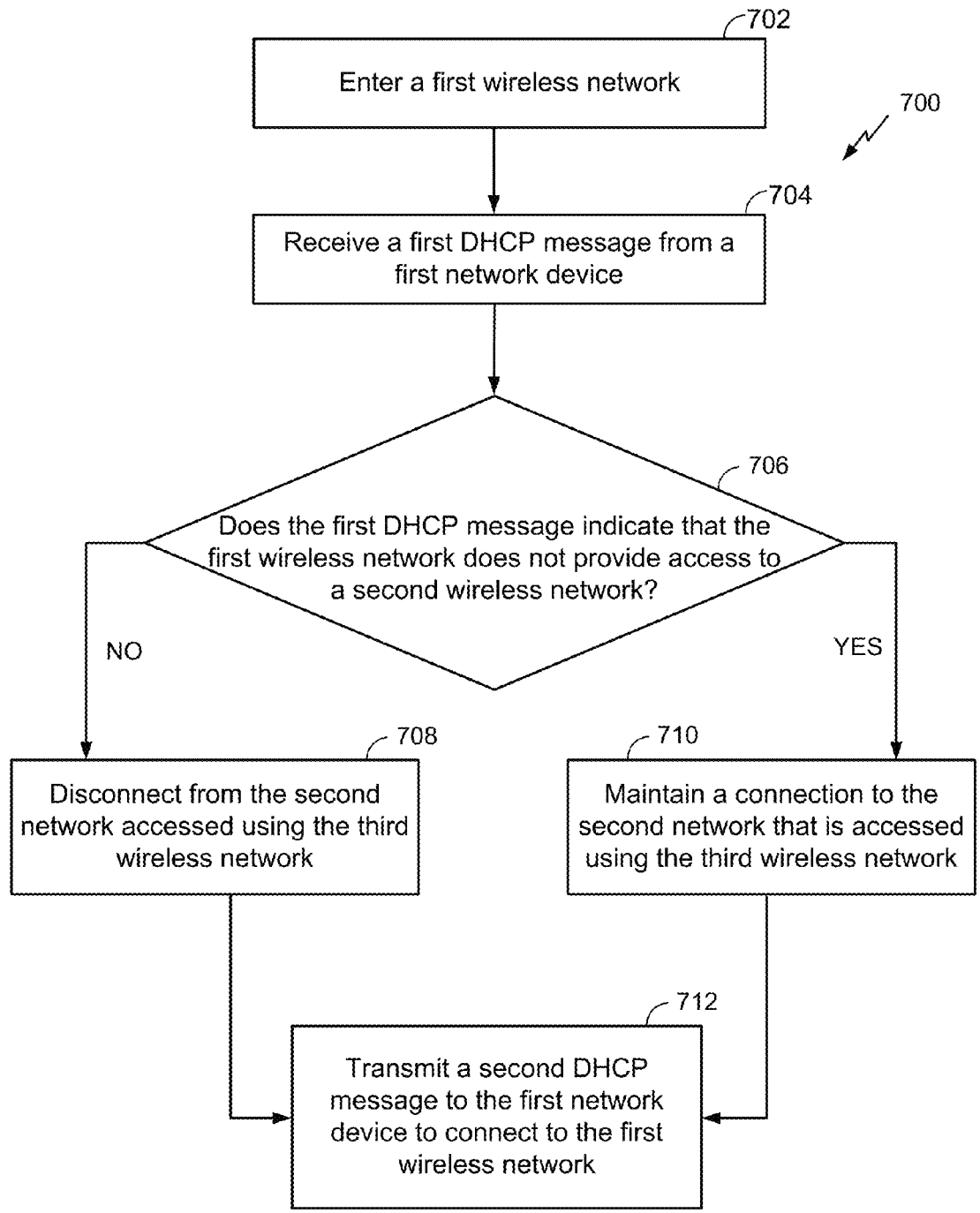
FIG. 7 illustrates a flowchart of another exemplary method of connecting to a wireless network.

FIG. 7 illustrates a flowchart 700 of another exemplary method of connecting to a first wireless network. At block 702, the method begins by entering a first wireless network. For example, the STA 106a enters the WLAN network 102. Upon entering the WLAN network 102, the STA 106a may begin by broadcasting a DHCP Discover message to various DHCP servers on the WLAN network 102. At block 704, the method receives a first DHCP message from a first network device. For example, the first DHCP message may be a DHCP Offer message sent by the server 118 in response to the DHCP Discover message. Alternatively, the first DHCP message may be a DHCP Ack message sent by the server 118 after the STA 106a has requested configuration parameters by sending a DHCP Request message to the server 118.

At block 706, the method continues by determining whether the first DHCP message indicates that the first wireless network does not provide access to a second wireless network. At block 708, if it is determined that the first DHCP message indicates that the first wireless network does provide access to the second wireless network, the method disconnects from the second network accessed using a third wireless network. For example, the STA 106a may determine that the WLAN network 102 does provide access to the data network 120 based on a router option and a Domain Name System (DNS) server option being included in the first DHCP message. The STA 106a may then disconnect from the data network 120 that was being accessed using the WAN network 114. At block 712, the method transmits a second DHCP message to the first network device to connect to the first wireless network. For example, the STA 106a may transmit a DHCP Request message requesting the configuration parameters offered by the server 118 in order to complete configuration for the WLAN network 102. In this example, the STA 106a will have access to the data network 120 through the WLAN network 102.

At block 710, if it is determined that the first DHCP message indicates that the first wireless network does not provide access to the second wireless network, the method maintains a connection to the second network that is accessed using the third wireless network. For example, the STA 106a may determine that the WLAN network 102 does not provide access to the data network 120 based on the exclusion of a router option and a Domain Name System (DNS) server option from first DHCP message. In response to receiving the first DHCP message without router and DNS server options, the STA 106a may maintain its connection to the data network 120 that is being accessed using the WAN network 114. The STA 106a will then have continued access to the data network 120 using WAN network 114, while also being able to simultaneously access the WLAN network 102. At block 712, the method transmits a second DHCP message to the first network device to connect to the first wireless network. For example, the STA 106a may transmit a DHCP Request message requesting the configuration parameters offered by the server 118 in order to complete configuration for the WLAN network 102.

Figure 8:
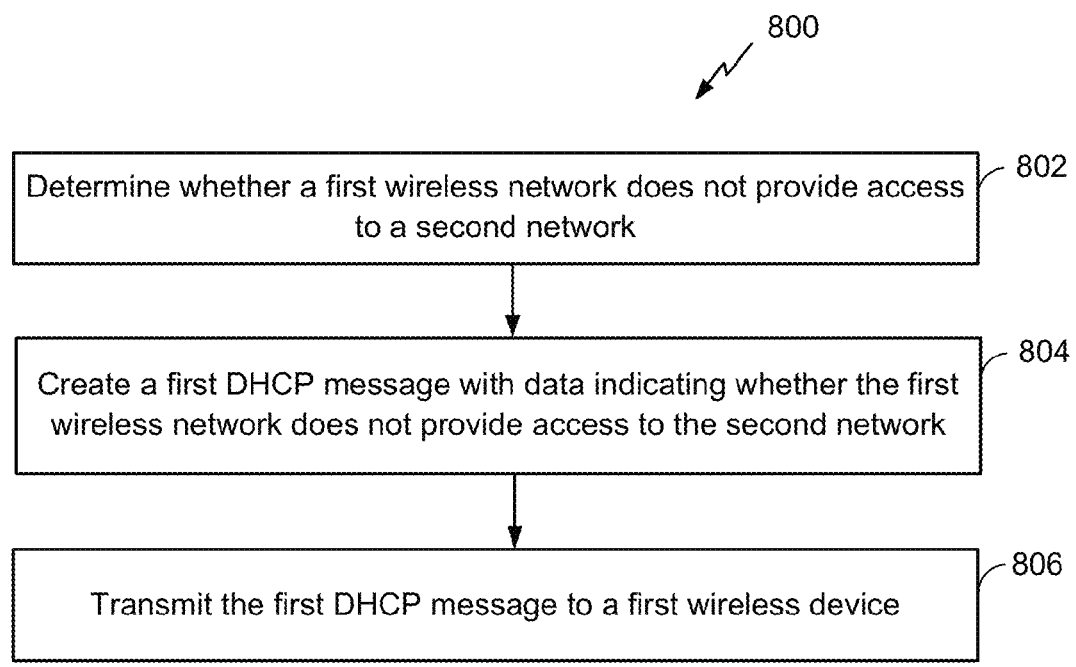
FIG. 8 illustrates a flowchart of an exemplary method of providing access to a wireless network.

FIG. 8 illustrates a flowchart 800 of an exemplary method of providing access to a first wireless network. At block 802, the method begins by determining whether the first wireless network does not provide access to a second network. For example, the server 118 may determine that the WLAN network 102 does not provide access to the data network 120. At block 804, the method continues by creating a first DHCP message with data indicating whether the first wireless network does not provide access to the second network. For example, the server 118 may exclude a router option and a Domain Name System (DNS) server option from first DHCP message indicating that the WLAN network 102 does not provide access to the data network 120. In another example, the server may include a router option and a Domain Name System (DNS) server option in first DHCP message to indicate that the WLAN network 102 does provide access to the data network 120. In some aspects, the first DHCP message may be a DHCP Offer message. In some aspects, the first DHCP message may be a DHCP Ack message. At block 806, the method transmits the first DHCP message to a first wireless device. For example, the server 118 may transmit a DHCP Offer message or DHCP Ack message to the STA 106a.

Figure 9:
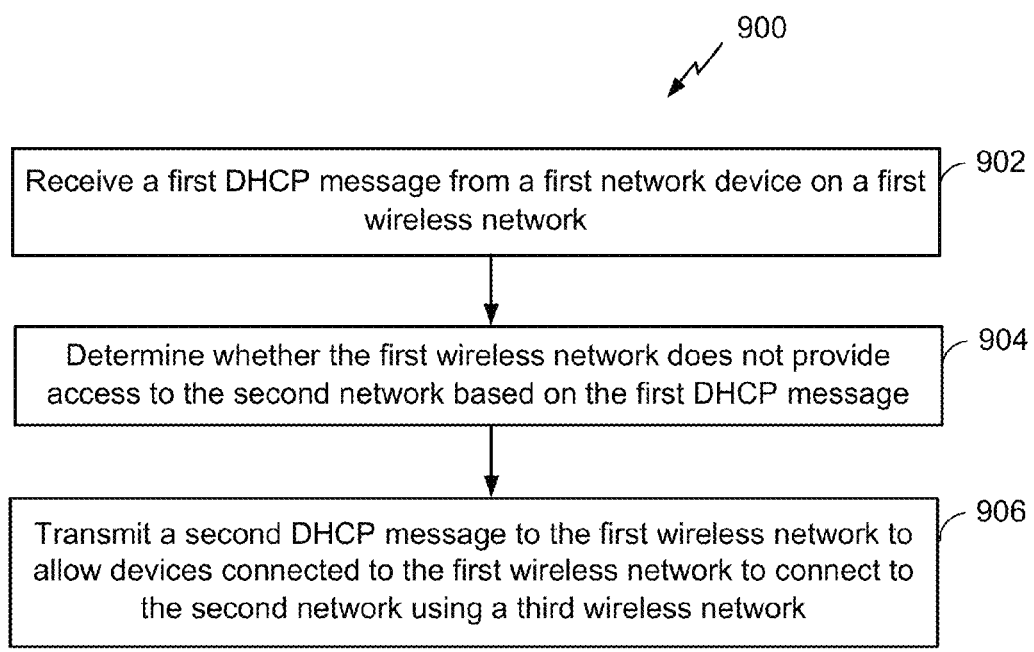
FIG. 9 illustrates a flowchart of an exemplary method of supplying devices on a first wireless network with access to a second network.

FIG. 9 illustrates a flowchart 900 of an exemplary method of supplying devices on a first wireless network with access to a second network. At block 902, the method begins by receiving a first DHCP message from a first network device on the first wireless network. For example, the first network may be the WLAN network 102 and the first network device may be the DHCP server 118 transmitting a first DHCP message to the STA 106a for configuration. In some aspects, the first DHCP message may be a DHCP Offer message. In some aspects, the first DHCP message may be a DHCP Ack message.

At block 904, the method continues by determining whether the first wireless network does not provide access to a second network based on the first DHCP message. In some aspects, the second network is the data network 120. For example, the server 118 may exclude a router option and a Domain Name System (DNS) server option from first DHCP message. In response to receiving the first DHCP message without router and DNS server options, the STA 106a may determine that the WLAN network 102 does not provide access to the network 120.

At block 906, the method continues by transmitting a second DHCP message to the first wireless network to allow devices connected to the first wireless network to connect to the second network using a third wireless network. For example, the STA 106a may be configured to share its data network 120 access being provided through the WAN network 114 with other STAs 106b-e. The second DHCP message may include a DHCP router announcement message with configuration parameters included in the DHCP options fields of the DHCP message.

Figure 10:
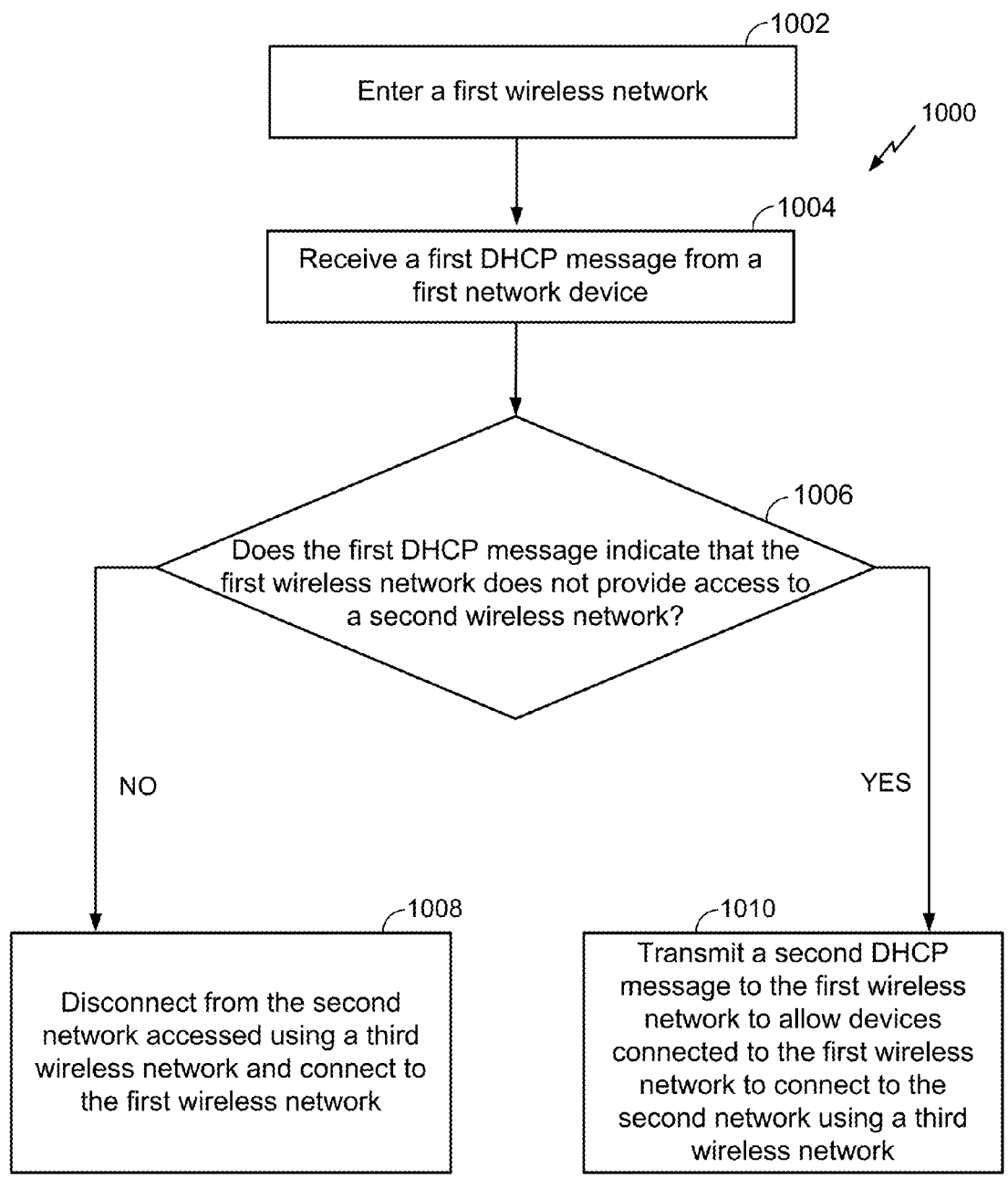
FIG. 10 illustrates a flowchart of another exemplary method of supplying devices on a first wireless network with access to a second network.

FIG. 10 illustrates a flowchart 1000 of another exemplary method of supplying devices on a first wireless network with access to a second network. At block 1002, the method begins by entering a first wireless network. For example, the STA 106a enters the WLAN network 102. Upon entering the WLAN network 102, the STA 106a may begin by broadcasting a DHCP Discover message to various DHCP servers on the WLAN network 102. At block 1004, the method receives a first DHCP message from a first network device. For example, the first DHCP message may be a DHCP Offer message sent by the server 118 in response to the DHCP Discover message. Alternatively, the first DHCP message may be a DHCP Ack message sent by the server 118 after the STA 106a has requested configuration parameters by sending a DHCP Request message to the server 118.

At block 1006, the method continues by determining whether the first DHCP message indicates that the first wireless network does not provide access to a second wireless network. At block 1008, if it is determined that the first DHCP message indicates that the first wireless network does provide access to the second wireless network, the method disconnects from the second network accessed using a third wireless network and connects to the first wireless network. For example, the STA 106a may determine that the WLAN network 102 does provide access to the data network 120 based on a router option and a Domain Name System (DNS) server option being included in the first DHCP message. The STA 106a may then disconnect from the data network 120 that was being accessed using the WAN network 114 and connect to the WLAN network 102. In this example, the STA 106a will have access to the data network 120 through the WLAN network 102.

At block 1010, if it is determined that the first DHCP message indicates that the first wireless network does not provide access to the second wireless network, the method continues by transmitting a second DHCP message to the first wireless network to allow devices connected to the first wireless network to connect to the second network using a third wireless network. For example, the STA 106a may determine that the WLAN network 102 does not provide access to the data network 120 based on the exclusion of a router option and a Domain Name System (DNS) server option from first DHCP message. In response to receiving the first DHCP message without router and DNS server options, the STA 106a may maintain its connection to the data network 120 that is being accessed using the WAN network 114. The second DHCP message may include a DHCP router announcement message comprising the Internet Protocol (IP) address of the STA 106a, indicating to the other STAs 106b-e that the STA 106a is acting as a router through which the STAs 106b-e may access the data network 120 using the WAN network 114. The DHCP router announcement message may further include the IP addresses of any Domain Name System (DNS) servers on the data network 120. In some aspects, the DHCP router announcement message may be transmitted by STA 106a as a unicast message directly to the server 118, as illustrated in FIG. 2. In some aspects, the router announcement message may be transmitted by the STA 106a as a broadcast message to all devices on the WLAN network 102, as illustrated in FIG. 3.

Accordingly, based on the above devices, systems, and methods, increased connectivity may be achieved in the wireless communication network 100.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein may be downloaded and/or otherwise obtained by a user terminal and/or base station as applicable. For example, such a device may be coupled to a server to facilitate the transfer of means for performing the methods described herein. Alternatively, various methods described herein may be provided via storage means (e.g., RAM, ROM, a physical storage medium such as a compact disc (CD) or floppy disk, etc.), such that a user terminal and/or base station may obtain the various methods upon coupling or providing the storage means to the device. Moreover, any other suitable technique for providing the methods and techniques described herein to a device may be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A wireless device configured to connect to a first wireless network, comprising:
   a receiver configured to receive a first dynamic host configuration protocol (DHCP) message from a first network device on the first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;
   a processor configured to:
      analyze the first DHCP message to determine that the first DHCP message indicates that the first wireless network does not provide access to a second network based on the exclusion of the option in the first DHCP message; and
      determine whether to maintain a connection to the second network accessed using a third wireless network based on the analysis of the first DHCP message, wherein the third wireless network provides access to the second network; and
   a transmitter configured to transmit a second DHCP message to the first network device to connect to the first wireless network,
   wherein the wireless device is further configured to:
   broadcast a third DHCP message to the first wireless network, wherein the third DHCP message indicates that the wireless device provides access to the second wireless network from the first wireless network using the third wireless network; and
   provide access to the second network to at least one device connected to the first wireless network using the third wireless network.

2. The wireless device of claim 1, wherein the first wireless network is a wireless local area network (WLAN).

3. The wireless device of claim 2, wherein the third wireless network is a wide area network (WAN).

4. The wireless device of claim 3, wherein the second network is an Internet network.

5. The wireless device of claim 1, wherein the first network device is a DHCP server.

6. The wireless device of claim 1, wherein the option comprises one or both of router data and domain name system (DNS) server data.

7. The wireless device of claim 6, wherein the first DHCP message includes acknowledgement information.

8. The wireless device of claim 6, wherein the first DHCP message includes Internet Protocol (IP) lease offer information.

9. The wireless device of claim 1, wherein the third DHCP message comprises a router announcement message including an Internet protocol (IP) address of the wireless device.

10. The wireless device of claim 1, wherein the transmitter is further configured to transmit the third DHCP message directly to the first network device.

11. A method for connecting to a first wireless network, comprising:
   receiving a first dynamic host configuration protocol (DHCP) message from a first network device on the first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;
   analyzing the first DHCP message and determining that the first DHCP message indicates that the first wireless network does not provide access to a second network based on the exclusion of the option in the first DHCP message;

determining whether to maintain a connection to the second network accessed using a third wireless network based on the analysis of the first DHCP message, wherein the third wireless network provides access to the second network;

transmitting a second DHCP message to the first network device to connect to the first wireless network;

broadcasting a third DHCP message to the first wireless network, wherein the third DHCP message indicates that access is provided to the second wireless network from the first wireless network using the third wireless network; and providing access to the second network to at least one device connected to the first wireless network using the third wireless network.

12. The method of claim 11, wherein the first wireless network is a wireless local area network (WLAN).

13. The method of claim 12, wherein the third wireless network is a wide area network (WAN).

14. The method of claim 13, wherein the second network is an Internet network.

15. The method of claim 11, wherein the first network device is a DHCP server.

16. The method of claim 11, wherein the option comprises one or both of router data and domain name system (DNS) server data.

17. The method of claim 16, wherein the first DHCP message includes acknowledgement information.

18. The method of claim 16, wherein the first DHCP message includes Internet Protocol (IP) lease offer information.

19. The method of claim 11, wherein the third DHCP message comprises a router announcement message including an Internet protocol (IP) address.

20. The method of claim 11, further comprising:
transmitting the third DHCP message directly to the first network device.

21. A non-transitory computer readable medium comprising instructions that when executed cause an apparatus to:
receive a first dynamic host configuration protocol (DHCP) message from a first network device on a first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;

analyze the first DHCP message to determine that-the first DHCP message indicates that the first wireless network does not provide access to a second network based on the exclusion of the option in the first DHCP message;

determine whether to maintain a connection to the second network accessed using a third wireless network based on the analysis of the first DHCP message, wherein the third wireless network provides access to the second network;

transmit a second DHCP message to the first network device to connect to the first wireless network;

broadcast a third DHCP message to the first wireless network, wherein the third DHCP message indicates that the apparatus provides access to the second wireless network from the first wireless network using the third wireless network provide access to the second network to at least one device connected to the first wireless network using the third wireless network.

22. The computer readable medium of claim 21, wherein the first wireless network is a wireless local area network (WLAN).

23. The computer readable medium of claim 22, wherein the third wireless network is a wide area network (WAN).

24. The computer readable medium of claim 23, wherein the second network is an Internet network.

25. The computer readable medium of claim 21, wherein the first network device is a DHCP server.

26. The computer readable medium of claim 21, wherein the option comprises one or both of router data and domain name system (DNS) server data.

27. The computer readable medium of claim 26, wherein the first DHCP message includes acknowledgement information.

28. The computer readable medium of claim 26, wherein the first DHCP message includes Internet Protocol (IP) lease offer information.

29. The computer readable medium of claim 21, wherein the third DHCP message comprises a router announcement message including an Internet protocol (IP) address of the apparatus.

30. The computer readable medium of claim 21, further comprising instructions that when executed cause the apparatus to:
transmit the third DHCP message directly to the first network device.

31. A network device configured to provide access to a first wireless network, comprising:
a processor configured to:
determine, in response to a message received from a first wireless device comprising a router announcement message and based on analysis of the message, wherein the router announcement message includes an Internet Protocol (IP) address of the network device, that the first wireless network does not provide access to a second network; and create a first dynamic host configuration protocol (DHCP) message that excludes an option, wherein the exclusion of the option from the DHCP message indicates to the first wireless device that-the first wireless network does not provide access to the second network, wherein the first DHCP message utilizes a Dynamic Host Configuration (DHC) protocol that has been expanded to include a router announcement message format as part of the DHC protocol; and a transmitter configured to transmit the first DHCP message to the first wireless device, and to receive a second DHCP message from the first wireless device, wherein the second DHCP message indicates that the first wireless device provides access to the second wireless network from the first wireless network using a third wireless network.

32. The network device of claim 31, wherein the first wireless network is a wireless local area network (WLAN).

33. The network device of claim 32, wherein the second network is an Internet network.

34. The network device of claim 31, wherein the network device is a DHCP server.

35. The network device of claim 31, wherein the option comprises one or both of router data and domain name system (DNS) server data.

36. The network device of claim 35, wherein the first DHCP message includes acknowledgement information.

37. A method for providing access to a first wireless network, comprising:
  determining, in response to a message received from a first wireless device comprising a router announcement message and based on analysis of the message, wherein the router announcement message includes an Internet Protocol (IP) address of a first network device, that the first wireless network does not provide access to a second network;
  creating a first dynamic host configuration protocol (DHCP) message that excludes an option, wherein the exclusion of the option from the DHCP message indicates to the first wireless device that the first wireless network does not provide access to the second network, wherein the first DHCP message utilizes a Dynamic Host Configuration (DHC) protocol that has been expanded to include a router announcement message format as part of the DHC protocol;
  transmitting the first DHCP message to the first wireless device; and
  receiving a second DHCP message from the first wireless device, wherein the second DHCP message indicates that the first wireless device provides access to the second wireless network from the first wireless network using a third wireless network.

38. The method of claim 37, wherein the first wireless network is a wireless local area network (WLAN).

39. The method of claim 38, wherein the second network is an Internet network.

40. The method of claim 37, wherein the first network device is a DHCP server.

41. The method of claim 37, wherein the option comprises one or more of router data and domain name system (DNS) server data.

42. The method of claim 41, wherein the first DHCP message includes acknowledgement information.

43. A non-transitory computer readable medium comprising instructions that when executed cause a network device to:
  determine, in response to a message received from a first wireless device comprising a router announcement message and based on analysis of the message, wherein the router announcement message includes an Internet Protocol (IP) address of the network device, that a first wireless network does not provide access to a second network;
  create a first dynamic host configuration protocol (DHCP) message that excludes an option, wherein the exclusion of the option from the DHCP message indicates to the first wireless device that the first wireless network does not provide access to the second network, wherein the first DHCP message utilizes a Dynamic Host Configuration (DHC) protocol that has been expanded to include a router announcement message format as part of the DHC protocol;
  transmit the first DHCP message to the first wireless device; and
  receive a second DHCP message from the first wireless device, wherein the second DHCP message indicates that the first wireless device provides access to the second wireless network from the first wireless network using a third wireless network.

44. The computer readable medium of claim 43, wherein the first wireless network is a wireless local area network (WLAN).

45. The computer readable medium of claim 44, wherein the second network is an Internet network.

46. The computer readable medium of claim 43, wherein the network device is a DHCP server.

47. The computer readable medium of claim 43, wherein the option comprises one or both of router data and domain name system (DNS) server data.

48. The computer readable medium of claim 47, wherein the first DHCP message includes acknowledgement information.

49. A wireless device configured to supply devices on a first wireless network with access to a second network, comprising:
  a receiver configured to receive a first dynamic host configuration protocol (DHCP) message from a first network device on the first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;
  a processor configured to analyze the first DHCP message to determine that the first wireless network does not provide access to the second network based on the exclusion of the option in the first DHCP message; and
  a transmitter configured to transmit a second DHCP message to the first wireless network, wherein the second DHCP message indicates that the wireless device provides access to the second wireless network from the first wireless network using a third wireless network.

50. The wireless device of claim 49, wherein the first wireless network is a Wireless Local Area Network (WLAN).

51. The wireless device of claim 50, wherein the third wireless network is a Wide Area Network (WAN).

52. The wireless device of claim 51, wherein the second network is an Internet network.

53. The wireless device of claim 49, wherein the first network device comprises a DHCP server.

54. The wireless device of claim 49, wherein the first DHCP message includes acknowledgement information.

55. The wireless device of claim 54, wherein the second DHCP message comprises a router announcement message including configuration information allowing the devices connected to the first wireless network to configure access to the second network.

56. The wireless device of claim 55, wherein the configuration information comprises an Internet protocol (IP) address of the wireless device.

57. The wireless device of claim 56, wherein the configuration information further comprises an IP address of at least one domain name system (DNS) server.

58. The wireless device of claim 55, wherein the transmitter is further configured to transmit the router announcement message as a broadcast message to the first wireless network.

59. The wireless device of claim 55, wherein the transmitter is further configured to transmit the router announcement message as a unicast message directly to the first network device.

60. A method for supplying devices on a first wireless network with access to a second network, comprising:

receiving a first dynamic host configuration protocol (DHCP) message from a first network device on the first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;

analyzing the first DHCP message to determine that the first wireless network does not provide access to the second network based on the exclusion of the option in the first DHCP message; and transmitting a second DHCP message to the first wireless network, wherein the second DHCP message indicates that access is provided to the second wireless network from the first wireless network using a third wireless network.

61. The method of claim 60, wherein the first wireless network is a Wireless Local Area Network (WLAN).

62. The method of claim 61, wherein the third wireless network is a Wide Area Network (WAN).

63. The method of claim 62, wherein the second network is an Internet network.

64. The method of claim 60, wherein the first network device comprises a DHCP server.

65. The method of claim 60, wherein the first DHCP message includes acknowledgement information.

66. The method of claim 65, wherein the second DHCP message comprises a router announcement message including configuration information allowing the devices connected to the first wireless network to configure access to the second network.

67. The method of claim 66, wherein the configuration information comprises an Internet protocol (IP) address of the wireless device.

68. The method of claim 67, wherein the configuration information further comprises an IP address of at least one domain name system (DNS) server.

69. The method of claim 66, further comprising:
transmitting the router announcement message as a broadcast message to the first wireless network.

70. The method of claim 66, further comprising:
transmitting the router announcement message as a unicast message directly to the first network device.

71. A non-transitory computer readable medium comprising instructions that when executed cause an apparatus to:

receive a first dynamic host configuration protocol (DHCP) message from a first network device on the first wireless network, wherein the first DHCP message utilizes a Dynamic Host Configuration (DHC) protocol that has been expanded to include a router announcement message format as part of the DHC protocol, wherein the first DHCP message excludes an option, wherein the first DHCP message comprises a router announcement message, and wherein the router announcement message includes an Internet Protocol (IP) address of the first network device;

analyze the first DHCP message to determine that the first wireless network does not provide access to the second network based on the exclusion of the option in the first DHCP message; and transmit a second DHCP message to the first wireless network, wherein the second DHCP message indicates that the apparatus provides access to the second wireless network from the first wireless network using a third wireless network.

72. The computer readable medium of claim 71, wherein the first wireless network is a Wireless Local Area Network (WLAN).

73. The computer readable medium of claim 72, wherein the third wireless network is a Wide Area Network (WAN).

74. The computer readable medium of claim 73, wherein the second network is an Internet network.

75. The computer readable medium of claim 71, wherein the first network device comprises a DHCP server.

76. The computer readable medium of claim 71, wherein the first DHCP message includes acknowledgement information.

77. The computer readable medium of claim 76, wherein the second DHCP message comprises a router announcement message including configuration information allowing the devices connected to the first wireless network to configure access to the second network.

78. The computer readable medium of claim 77, wherein the configuration information comprises an Internet protocol (IP) address of the wireless device.

79. The computer readable medium of claim 78, wherein the configuration information further comprises an IP address of at least one domain name system (DNS) server.

80. The computer readable medium of claim 66, further comprising instructions that when executed cause the apparatus to:
transmit the router announcement message as a broadcast message to the first wireless network.

81. The computer readable medium of claim 66, further comprising instructions that when executed cause the apparatus to:
transmit the router announcement message as a unicast message directly to the first network device.

\* \* \* \* \*